(12) United States Patent
Takiguchi

(10) Patent No.: US 12,715,513 B2
(45) Date of Patent: Aug. 25, 2026

(54) ROUTING STRUCTURE FOR HOOD LOCK RELEASE CABLE

(71) Applicant: SUBARU CORPORATION, Tokyo (JP)

(72) Inventor: Shintaro Takiguchi, Tokyo (JP)

(73) Assignee: Subaru Corporation, Tokyo (JP)

( * ) Notice: Subject to any disclaimer, the term of this patent is extended or adjusted under 35 U.S.C. 154(b) by 307 days.

(21) Appl. No.: 18/514,805

(22) Filed: Nov. 20, 2023

(65) Prior Publication Data

US 2024/0190505 A1 Jun. 13, 2024

(30) Foreign Application Priority Data

Dec. 13, 2022 (JP) ................................ 2022-198764

(51) Int. Cl.

| | |
|---|---|
| ***B62D 21/15*** | (2006.01) |
| ***B60R 13/00*** | (2006.01) |
| ***B60R 19/00*** | (2006.01) |
| ***B60R 21/00*** | (2006.01) |
| ***B62D 25/08*** | (2006.01) |
| ***E05B 79/20*** | (2014.01) |

(52) U.S. Cl.

CPC .............. *B62D 21/15* (2013.01); *B60R 13/00* (2013.01); *B60R 19/00* (2013.01); *B60R 21/00* (2013.01); *B62D 25/08* (2013.01); *E05B 79/20* (2013.01)

(58) Field of Classification Search

CPC ........ B62D 21/15; B62D 25/12; B62D 25/08; E05B 79/20; E05B 83/24; B60R 13/00; B60R 19/00; B60R 21/00

See application file for complete search history.

(56) References Cited

U.S. PATENT DOCUMENTS

2003/0080572 A1* 5/2003 So .......................... E05B 79/20 292/336.3
2004/0032129 A1 2/2004 Gates et al.

FOREIGN PATENT DOCUMENTS

| | | | | |
|---|---|---|---|---|
| DE | 102014109714 A1 * | 1/2016 | ............ | B62D 25/12 |
| EP | 1783308 A2 * | 5/2007 | ............ | E05B 79/20 |
| JP | 3125535 B2 * | 1/2001 | | |
| JP | 2007118793 A * | 5/2007 | ............ | E05B 79/20 |
| JP | 4401708 B | 1/2010 | | |

OTHER PUBLICATIONS

JP H11195329 A (Year: 1999).*
JP 2003137131 A (Year: 2003).*

* cited by examiner

*Primary Examiner* — Lori Lyjak
(74) *Attorney, Agent, or Firm* — McGinn IP Law Group, PLLC

(57) ABSTRACT

A routing structure for a hood lock release cable, includes a frame member, a hood lock release cable, and a peripheral component. The frame member surrounds an engine room of a body of a vehicle. The hood lock release cable is routed along the frame member and configured to operate a hood lock mechanism of an engine hood by being operated with an operation lever provided in a compartment of the vehicle. The peripheral component is mounted on the frame member at a position closer to the outside of the vehicle than the frame member. The frame member includes a flange at a position facing the peripheral component and at which a portion of the hood lock release cable is routed. The flange is shaped so as to be deformed and hold the hood lock release cable when a collision of the peripheral component occurs.

20 Claims, 12 Drawing Sheets

17
10a
10b
10
41
31
21
V
19
10
8c
8b
8a
8
IV
40
11
IV
6
13
20
7
8c
5
21
8b
19
20
15
9
14
2

6
11
14
10
16
9
13
12
15
8a 41
30
31
IX
29
28
30
31
VII, XI
21
10
29
21
28
VII, XI
VI
27
25
26
VI
8c
8b 28
29
30
31
8c 35
31
31
10b
10a
10
30
8b
8c

ROUTING STRUCTURE FOR HOOD LOCK RELEASE CABLE

CROSS-REFERENCE TO RELATED APPLICATIONS

The present application claims priority from Japanese Patent Application No. 2022-198764 filed on Dec. 13, 2022, the entire contents of which are hereby incorporated by reference.

BACKGROUND

The disclosure relates to a routing structure for a hood lock release cable that performs a release operation of a lock mechanism of an engine hood of a vehicle.

In the related art, a lock mechanism is provided at a front part of an engine room of a vehicle. When the engine room is closed by an engine hood, the lock mechanism performs engagement with a striker provided on a front part of the engine hood. Thus, the lock mechanism maintains such a closed state of the engine room (the lock mechanism locks the engine hood). The lock mechanism is structured such that such an engagement state between the lock mechanism and the striker can be released by an operation that uses a hood lock release cable (hereinafter, referred to as a lock release cable) and is performed in a compartment of the vehicle.

The lock release cable usually includes an outer tube and an inner wire. The outer tube constitutes the outer circumferential side of the lock release cable. The inner wire is inserted inside the outer tube.

In the lock release cable configured as described above, one end of the inner wire is coupled to the lock mechanism, and the other end is coupled to an operation lever provided in the vehicle compartment. Accordingly, the lock release cable is routed along a frame member and other members of a body of the vehicle surrounding the engine room. In this routing of the lock release cable, the outer tube of the lock release cable is fixed to the frame member and other members of the body with, for example, a retaining member or other members such that the entire lock release cable extends without slack.

For example, when a fixation part, such as the frame member and other members, deforms, the lock release cable routed as described above is displaced with the deforming of the fixation part. There is thus a chance that the displacement of the lock release cable causes detachment of the lock release cable from a coupling part on the lock mechanism side.

Various techniques each implemented in the routing structure of a lock release cable have been proposed to address such an unintended detachment of the lock release cable.

For example, Japanese Patent No. 4401708 discloses a structure that includes a flange having a cable retaining cavity (groove) on the lock mechanism side, regulates the displacement of the lock release cable, and prevents the outer tube (lock release cable) from coming off.

SUMMARY

An aspect of the disclosure provides a routing structure for a hood lock release cable. The routing structure includes a frame member, a hood lock release cable, and a peripheral component. The frame member surrounds an engine room of a body of a vehicle. The hood lock release cable is routed along the frame member and configured to operate a hood lock mechanism of an engine hood of the vehicle by being operated with an operation lever provided in a compartment of the vehicle. The peripheral component is mounted on the frame member at a position closer to the outside of the vehicle than the frame member. The frame member includes a flange at a position facing the peripheral component and at which a portion of the hood lock release cable is routed. The flange is shaped so as to be deformed and hold the hood lock release cable when a collision of the peripheral component occurs.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
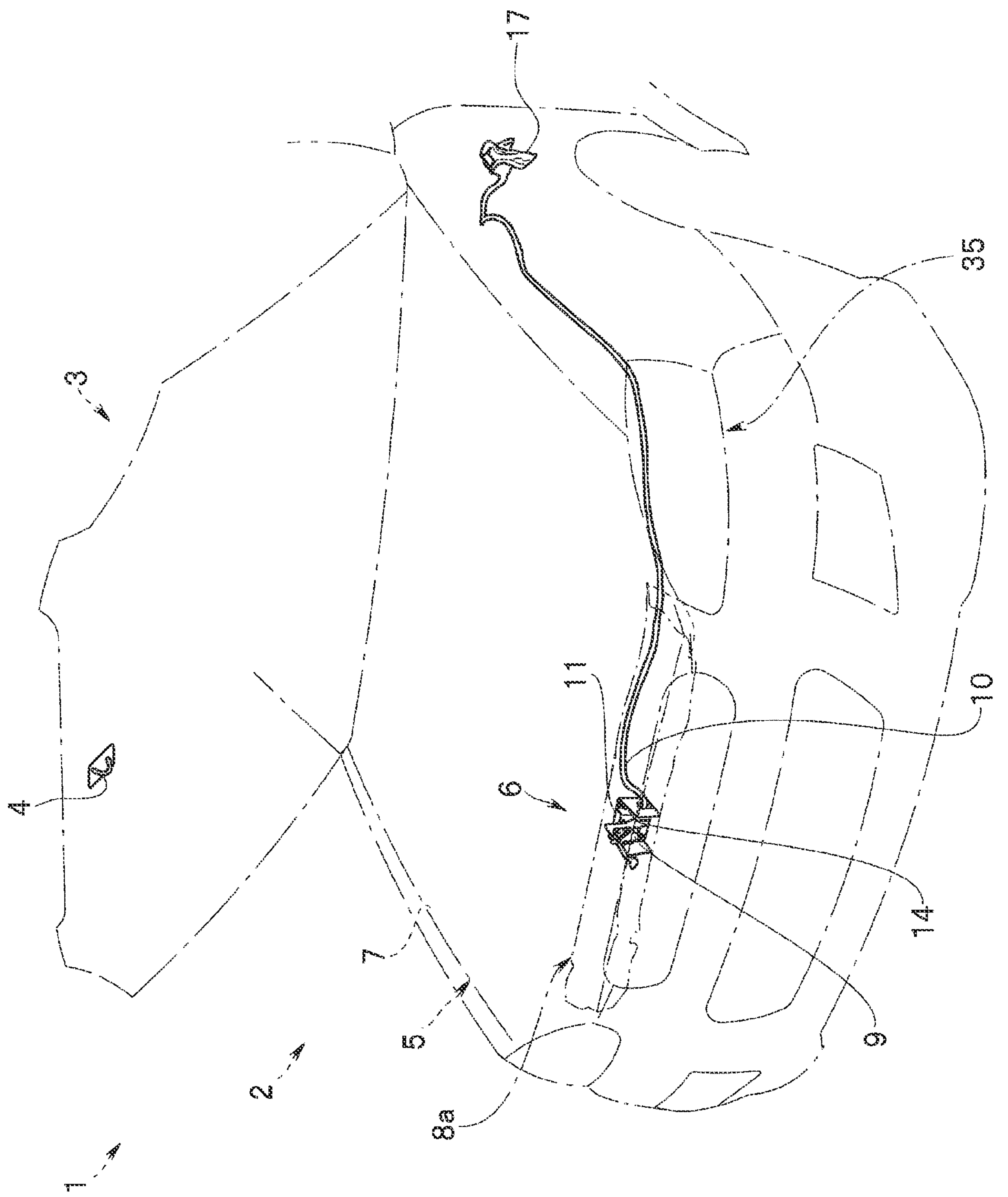
FIG. 1 is a perspective view illustrating a state where an engine hood in a front part of a body of a vehicle is open.

When a peripheral component is mounted on the outer side of the frame member and other members along which the lock release cable is routed, the lock release cable may be pushed into the engine room by the peripheral component due to an impact exerted during a collision or other events, and there is thus room for improvement. In such a case, the lock release cable is displaced by a displacement amount larger than that of the frame member.

That is, the lock release cable may be pushed in strongly by the peripheral component and may pull strongly the coupling part on the lock mechanism side, depending on the magnitude of the impact exerted during a collision or other events. In this case, relative to the lock mechanism, the lock release cable may perform an unintended lock release operation of the engine hood, and there is thus room for improvement.

It is desirable to provide a routing structure for a hood lock release cable, with which an unintended lock release of an engine hood caused by a lock mechanism is prevented even under a strong impact of a collision or other events of a vehicle.

Hereinafter, an embodiment of the disclosure will be described with reference to the accompanying drawings.

Note that, in the drawings used in the following description, the scales vary from one element to another to make each of the elements have a size large enough to be recognizable on the figures. Thus, the number of, the shapes of, and the proportions of the sizes of the elements, and the positional relationships between the elements of the embodiment of the disclosure are not limited to those illustrated in the figures.

The configuration of a lock device of an engine hood provided in a front part of a vehicle will be described as an example of a hood lock device for a vehicle, to which a routing structure of a hood lock release cable of the embodiment is applied. Note that the vehicle of the embodiment is a left-hand drive vehicle including a driver's seat positioned on the left side.

As FIG. 1 illustrates, a body 2 of a vehicle 1 includes an engine hood 3 and an engine room 5.

The engine hood 3 includes, for example, an outer panel and an inner panel of a steel sheet. Both ends of a rear end part (on the side of a compartment of the vehicle) of the engine hood 3 are pivotably supported by the body 2 with a pair of hinges (not illustrated) therebetween.

The engine hood 3 is further provided with a striker 4. The striker 4 is formed by, for example, a rod-shaped member being bent into a substantially U shape. The striker 4 protrudes, from the inner panel side, at the center in a front part of the engine hood 3.

The engine room 5 has an opening 7 through which the inside of the engine room 5 is open upward. The opening 7 can be closed and opened by the engine hood 3.

Figure 2:
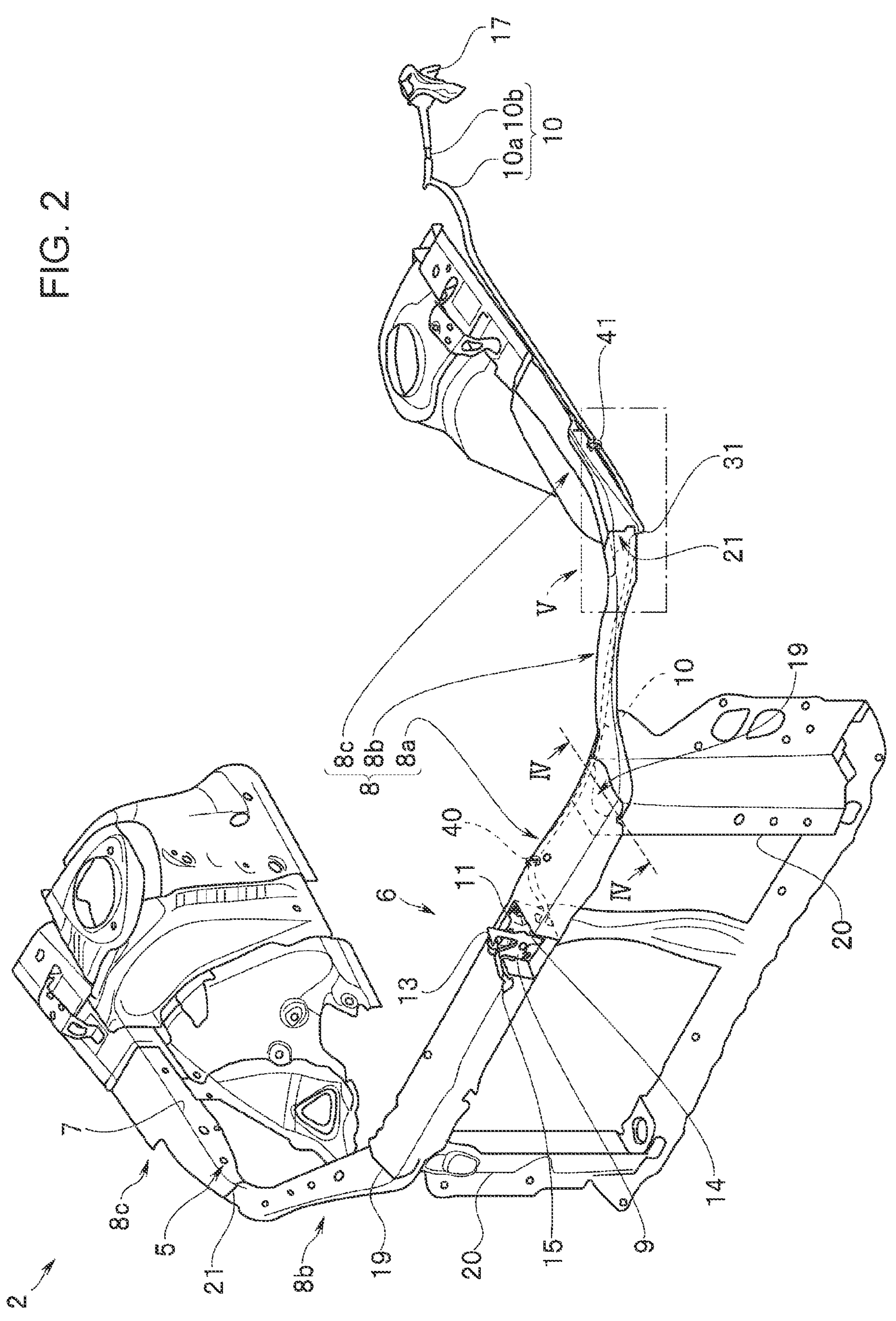
FIG. 2 is a perspective view of a hood lock release cable routed along a frame of the front part of the body.

As FIG. 2 illustrates, the opening 7 is formed along a frame 8 of the body 2 surrounding the engine room 5. The frame 8 is constituted by frame members being linked to one another.

In one example, the frame 8 includes the frame members such as a radiator-core upper frame 8*a*, a left-and-right pair of radiator-core side-upper frames 8*b*, and a left-and-right pair of upper frames 8*c*.

Figure 4:
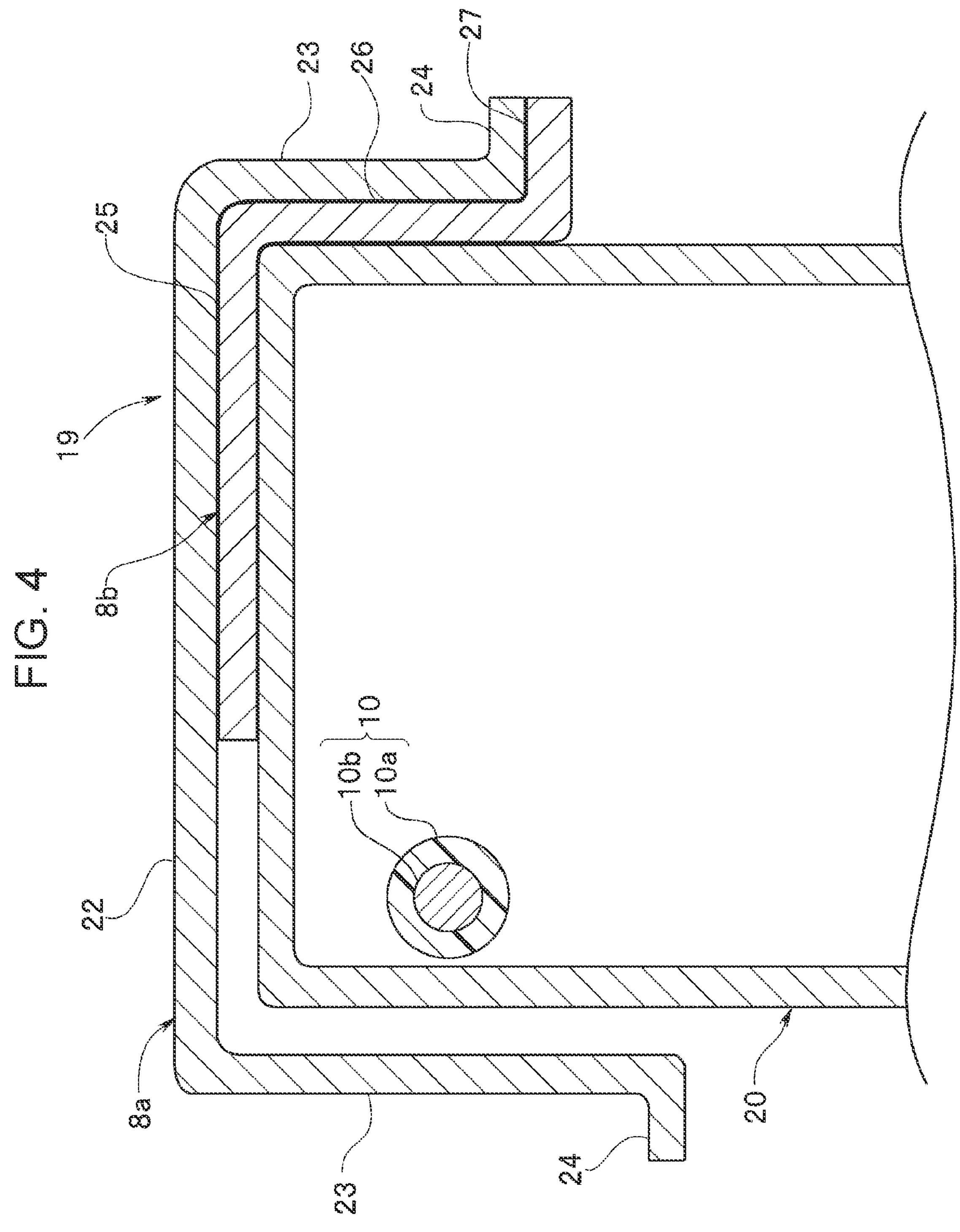
FIG. 4 is a cross-sectional view taken along line IV-IV in FIG. 2.

As FIG. 2 illustrates, the radiator-core upper frame 8*a* extends, in a vehicle width direction, in the front part of the body 2 (a front part of the opening 7). The radiator-core upper frame 8*a* includes a top panel 22, a front-and-rear pair of walls 23, and a front-and-rear pair of flanges 24, for example, as FIG. 4 illustrates.

The top panel 22 is formed at a position facing an inner surface (on the inner panel side) of a distal end part of the engine hood 3.

The walls 23 in a pair extend downward from both front and rear end parts of the top panel 22.

The flanges 24 in a pair extend from lower end parts of the walls 23 in a front-and-rear direction of the body 2.

With this configuration, the radiator-core upper frame 8*a* has a cross-section having a substantially hat shape protruding upward.

Figure 3:
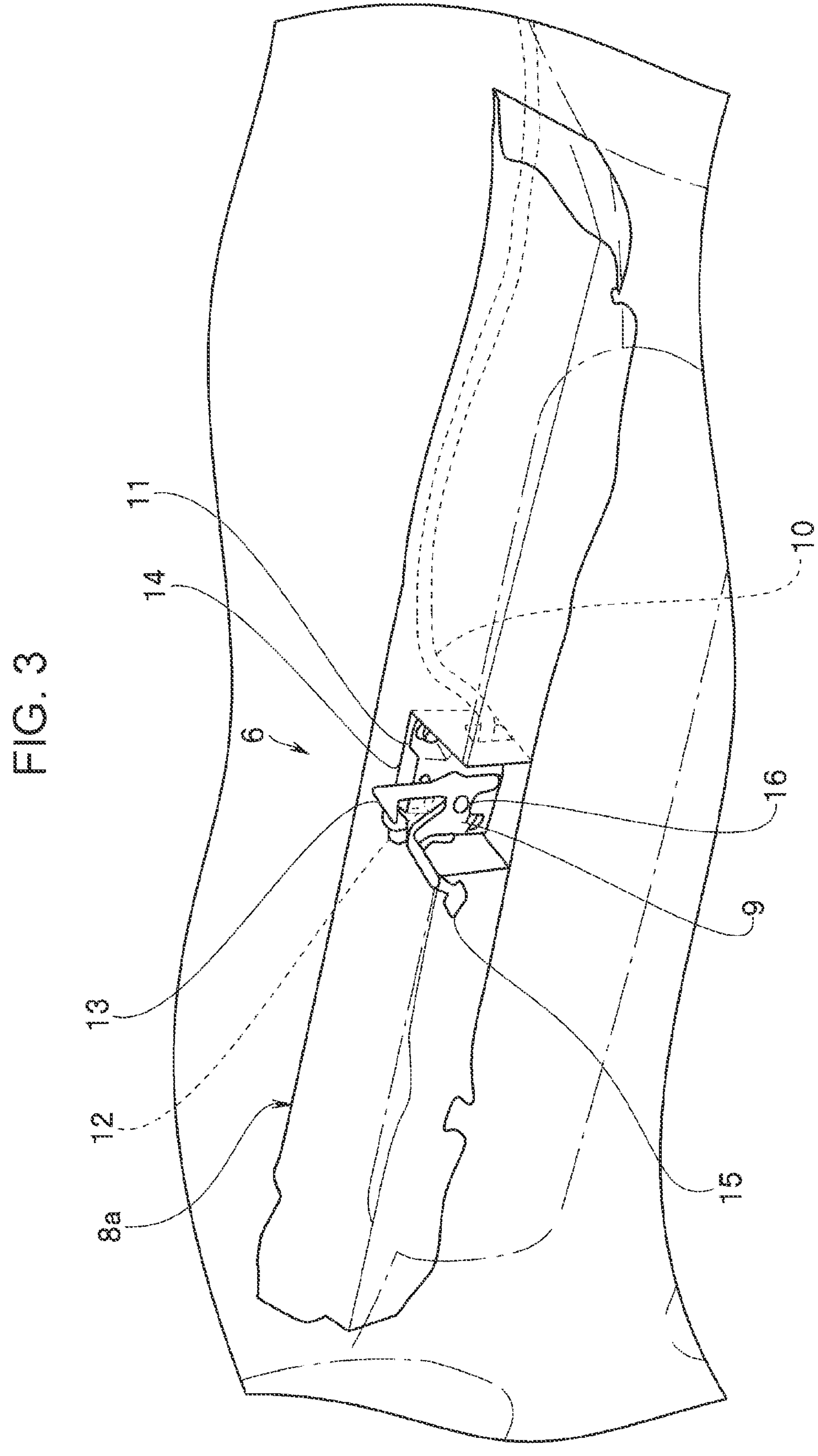
FIG. 3 is an enlarged view of a hood lock mechanism.

As FIG. 3 illustrates, the radiator-core upper frame 8*a* further has a recessed part 14 whose upper side and front side are open. The recessed part 14 is formed at a position being the center of the radiator-core upper frame 8*a* in the vehicle width direction and corresponding to the striker 4 mounted on the engine hood 3.

As FIG. 2 illustrates, the radiator-core side-upper frames 8*b* in a pair extend from both end parts of the radiator-core upper frame 8*a* toward the rear of the vehicle while being curved.

Figure 5:
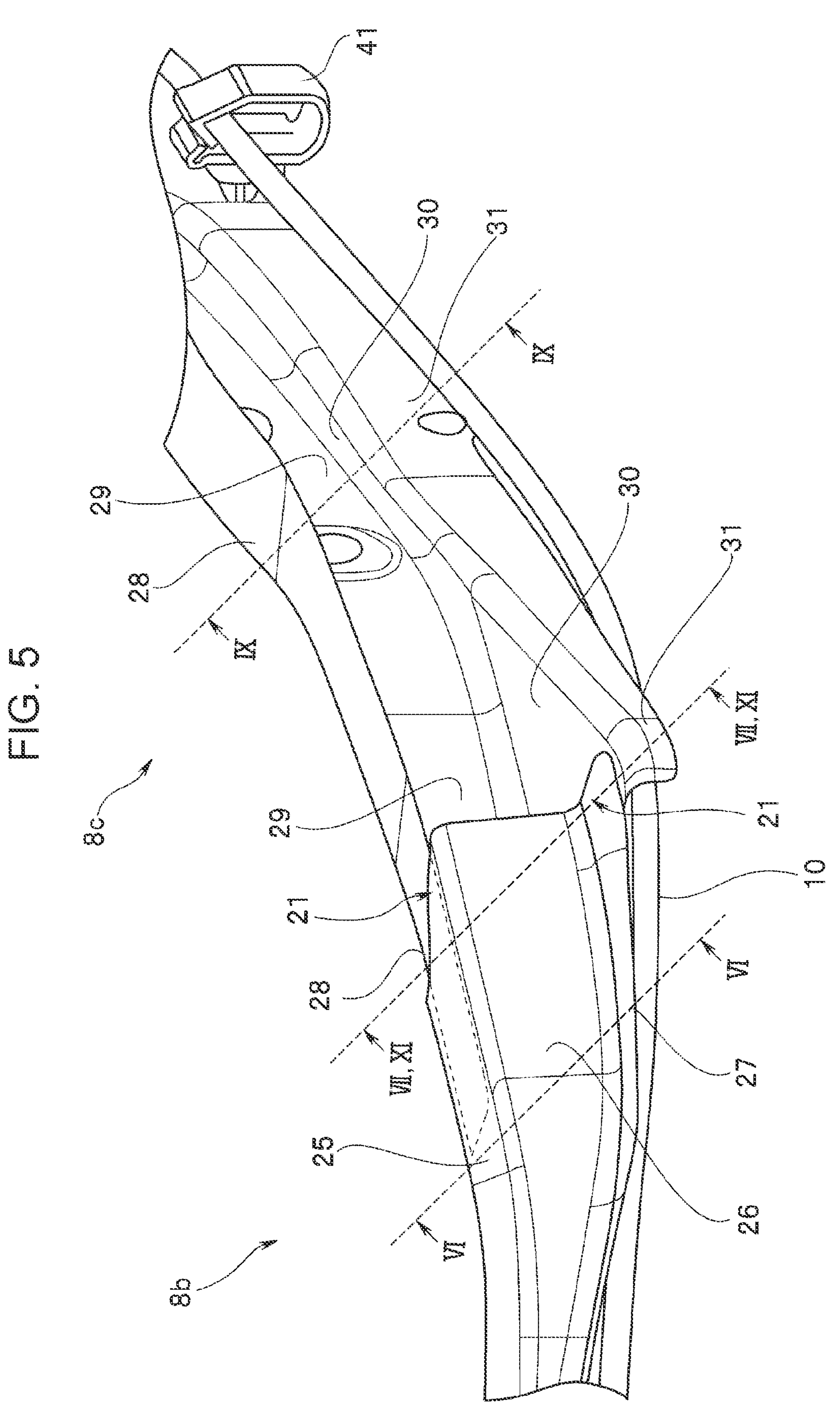
FIG. 5 is an enlarged view of region V in FIG. 2, including a radiator-core side-upper frame and an upper frame.
Figure 6:
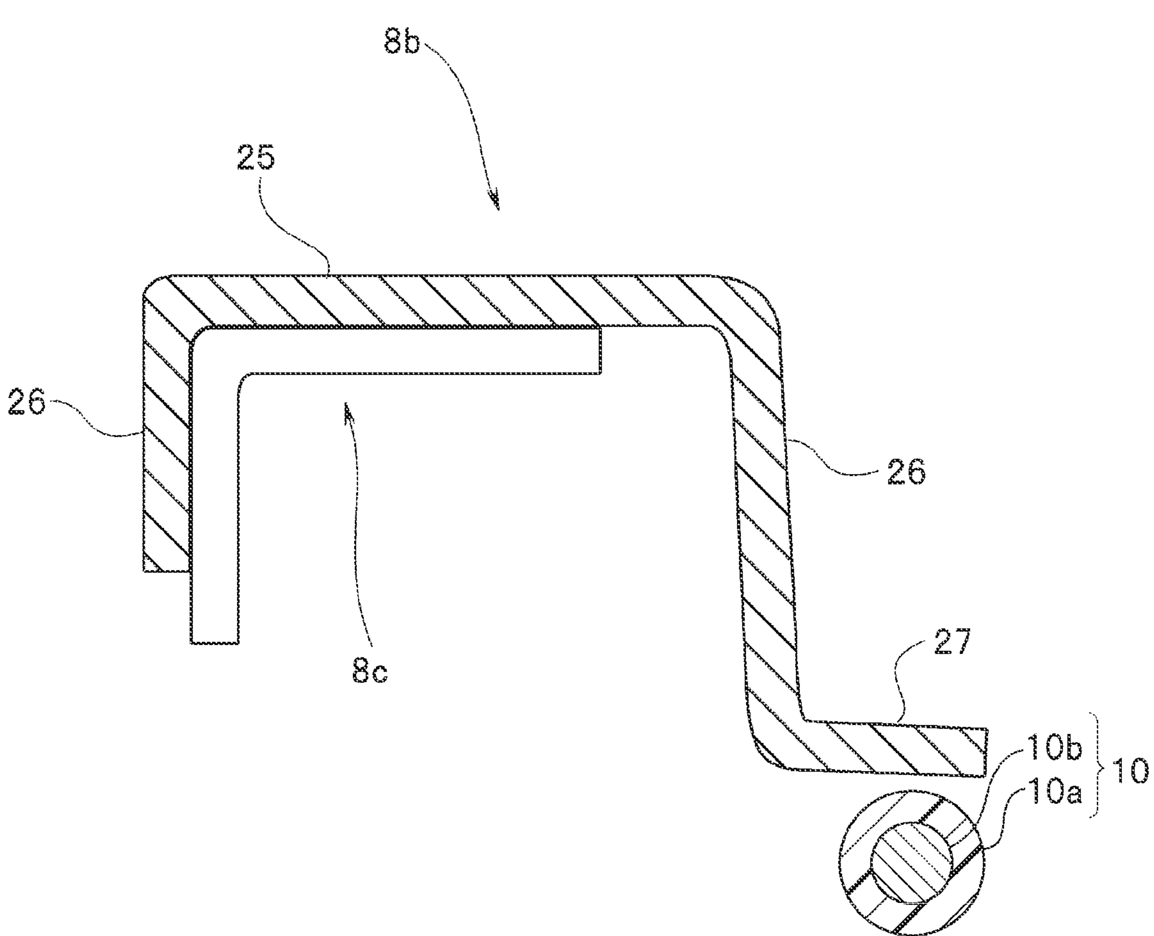
FIG. 6 is a cross-sectional view taken along line VI-VI in FIG. 5.
Figure 7:
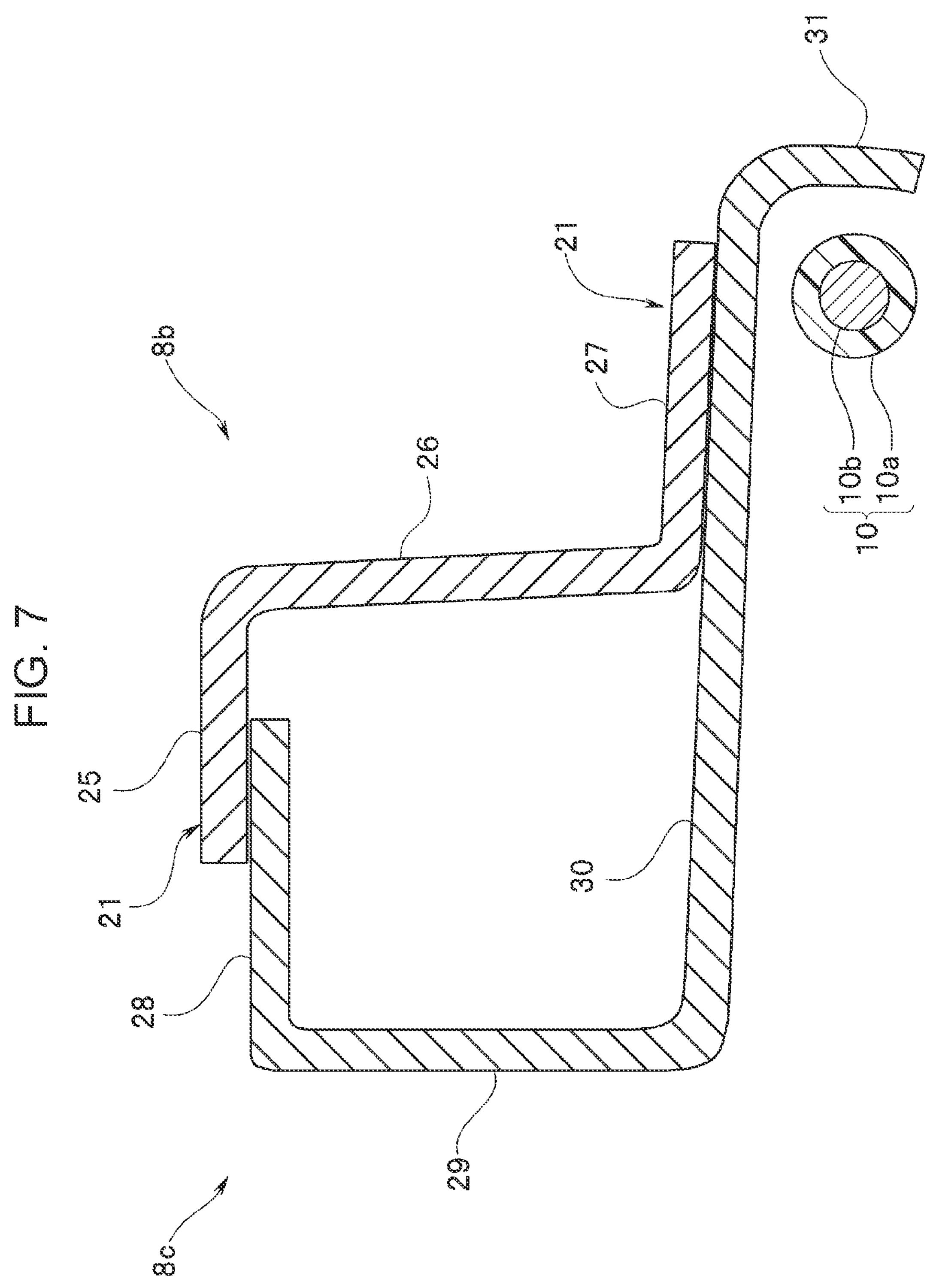
FIG. 7 is a cross-sectional view taken along line VII-VII in FIG. 5.
Figure 8:
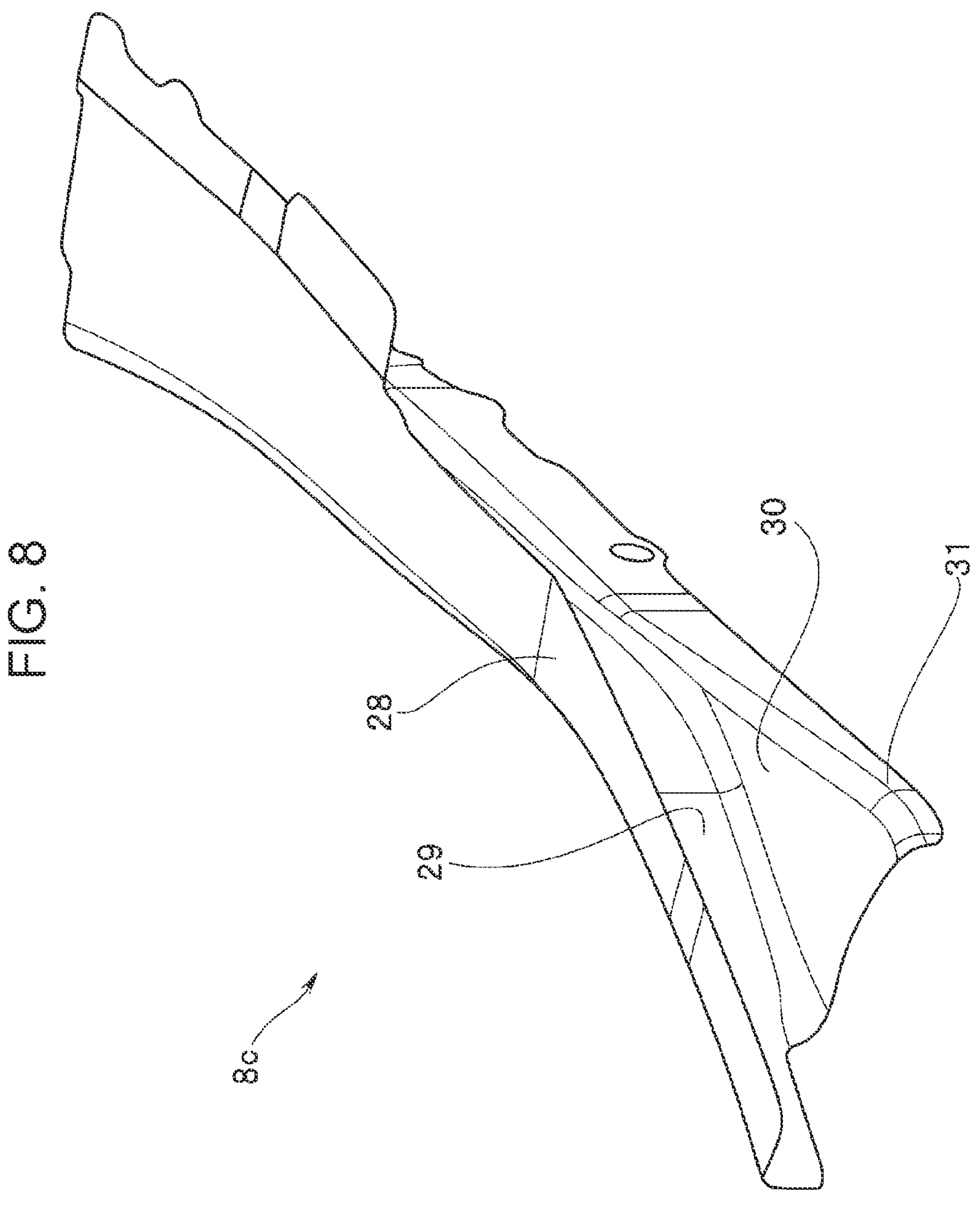
FIG. 8 is a perspective view of the upper frame.
Figure 9:
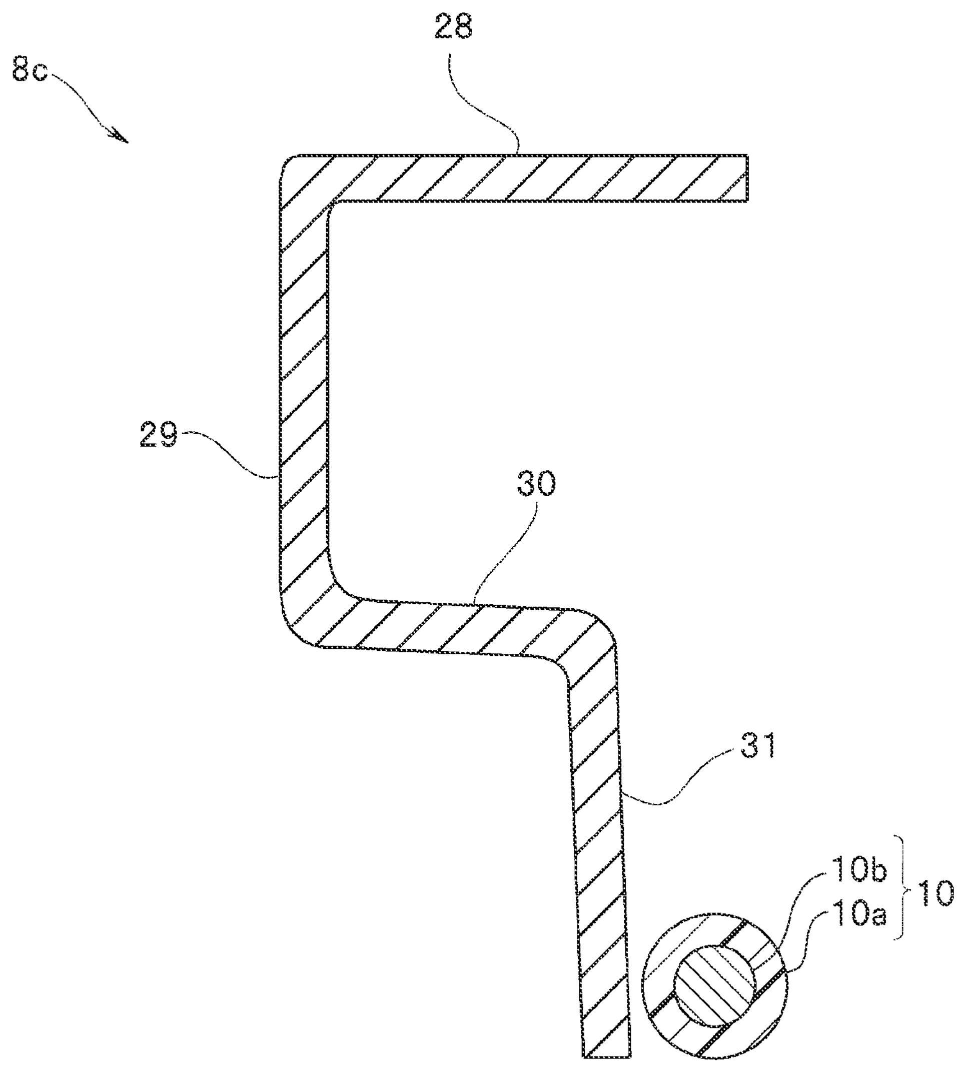
FIG. 9 is a cross-sectional view taken along line IX-IX in FIG. 5.

As FIGS. 5, 6, and 7 illustrate, each of the radiator-core side-upper frames 8*b* includes a top panel 25, a pair of walls 26, and a flange 27. Note that, here, the radiator-core side-upper frame 8*b* in a front left part of the body will be described as an example.

The top panel 25 is formed at a position facing an inner surface (on the inner panel side) of the engine hood 3.

The walls 26 in a pair extend downward from, of the top panel 25, an end part closer to the outside of the vehicle and an end part closer to the engine room 5. Here, as FIGS. 4 and 7 illustrate, the wall 26 closer to the engine room 5 is partially cut out in front and rear end parts of the radiator-core side-upper frame 8*b*.

The flange 27 extends from a lower end part of the wall 26 closer to the outside of the vehicle toward the outside of the vehicle.

As FIG. 2 illustrates, the upper frames 8*c* in a pair extend from rear end parts of the radiator-core side-upper frames 8*b* toward the rear of the vehicle.

As FIGS. 5, 7, 8, and 9 illustrate, each of the upper frames 8*c* includes a top panel 28, a wall 29, a bottom part 30, and a flange 31. Note that, here, the upper frame 8*c* in the front left part of the body will be described as an example.

The top panel 28 is formed at a position facing the inner surface (on the inner panel side) of the engine hood 3.

The wall 29 extends downward from an end part of the top panel 28 on the inner side in the vehicle width direction (on the engine room 5 side).

The bottom part 30 extends from a lower end part of the wall 29 to the outer side in the vehicle width direction (toward the outside of the vehicle).

The flange 31 extends downward from an end part of the bottom part 30 on the outer side in the vehicle width direction. As FIG. 7 illustrates, a distal end of the flange 31 has an arc shape directed slightly toward the inside of the vehicle.

In each of the frame members configured as described above, left and right end parts of the radiator-core upper frame 8*a* and front end parts of the radiator-core side-upper frames 8*b*, with upper end parts of radiator panel side members 20, constitute first coupling parts 19. The rear end parts of the radiator-core side-upper frames 8*b* and front end parts of the upper frames 8*c* constitute second coupling parts 21.

In one example, in each of the paired first coupling parts 19, as FIGS. 2 and 4 illustrate, the top panel 25 of the radiator-core side-upper frame 8*b* is in contact with the top panel 22 of the radiator-core upper frame 8*a* while overlapping from below. Further, the upper end part of the radiator panel side member 20 is in contact with the top panel 25 of the radiator-core side-upper frame 8*b* while overlapping from below. Each of the spots at which the above-described members are in contact with one another is joined by, for example, spot welding to form the first coupling part 19.

In each of the pairs of the second coupling parts 21, as FIGS. 2 and 7 illustrate, the top panel 28 of the upper frame 8*c* (one end) is in contact with the top panel 25 of the radiator-core side-upper frame 8*b* (the other end) while overlapping from below, and the bottom part 30 of the upper frame 8*c* (one end) is in contact with the flange 27 of the radiator-core side-upper frame 8*b* (the other end) while overlapping from below. Each of the spots at which the above-described members are in contact with one another is joined by, for example, spot welding to form the second coupling part 21.

Figure 10:
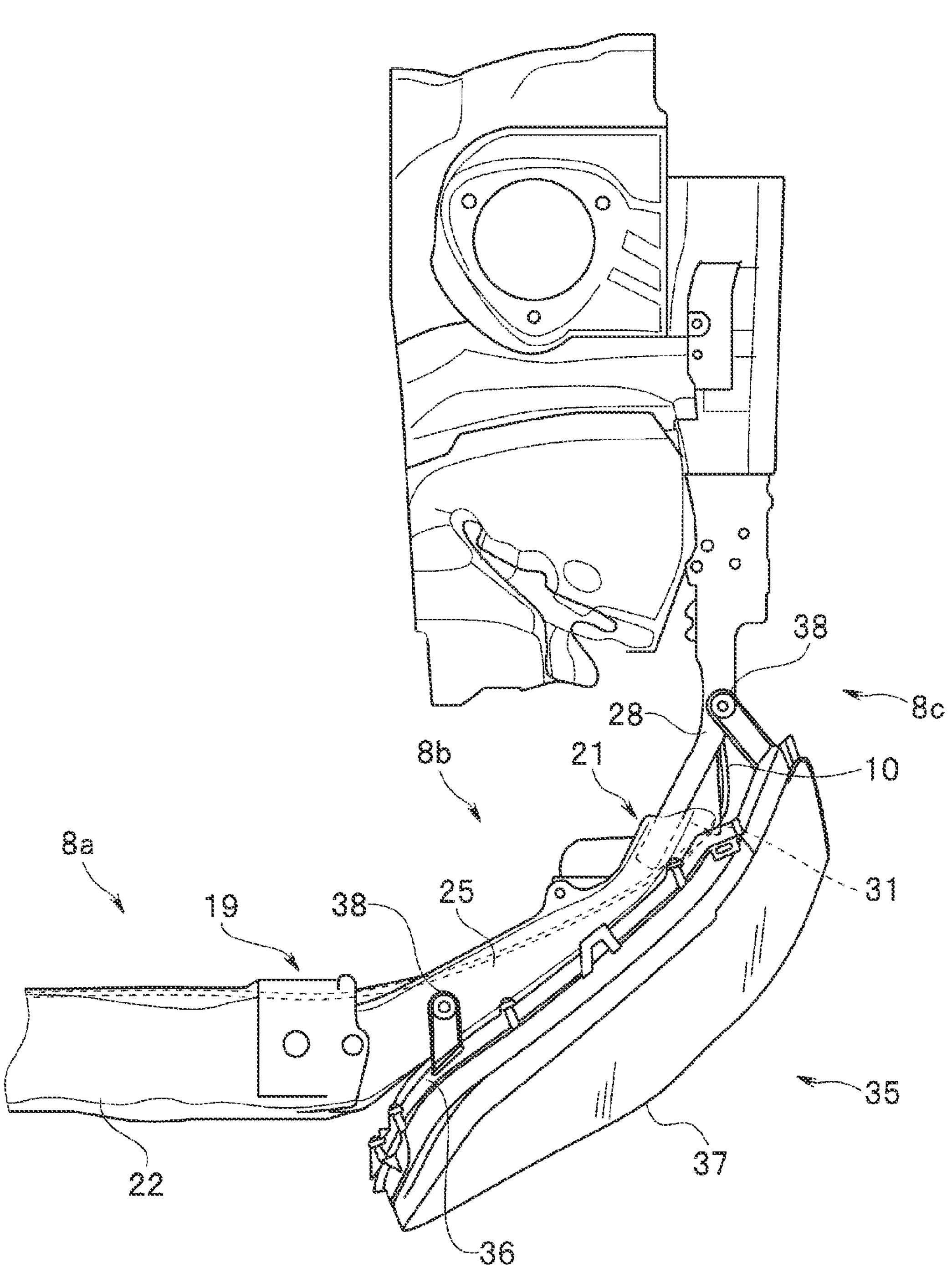
FIG. 10 is a plan view illustrating a headlamp unit and the frame.

As FIGS. 2, 3, and 10 illustrate, a headlamp unit 35 that is a peripheral component and a lock device 6 are mounted on the frame 8, of the front part of the body 2, configured as described above.

As FIG. 10 illustrates, the headlamp unit 35 is mounted on the radiator-core side-upper frame 8*b* and the upper frame 8*c* that are the frame members, at a position closer to the outside of the vehicle than the radiator-core side-upper frame 8*b* and the upper frame 8*c*.

In one example, the headlamp unit 35 includes a housing 36 retaining a light source, and a lens 37 covering a front part of the housing 36. A front-and-rear pair of brackets 38 is further provided on an upper part of the housing 36.

The brackets 38 in a front-and-rear pair are bolted to the top panel 25 of the radiator-core side-upper frame 8*b* and the top panel 28 of the upper frame 8*c*. Thus, the headlamp unit 35 is mounted on the frame 8.

With the headlamp unit 35 being mounted on the frame 8 as described above, the housing 36 faces a front end part of the flange 31. Thus, the headlamp unit 35 can deform the front end part of the flange 31 toward the inside of the body 2 when the headlamp unit 35 is displaced toward the inside of the body 2 due to a shift collision or other events of the vehicle 1. That is, such displacement of the headlamp unit 35 toward the inside of the body 2 can cause the front end part of the flange 31 to deform in a direction where the front end part of the flange 31 comes into contact with the bottom part 30 (refer to FIG. 11).

As FIG. 3 illustrates, for example, the lock device 6 is mounted on a surface, of the vehicle front part, constituting the recessed part 14 of the radiator-core upper frame 8*a* by a bracket 11.

The lock device 6 includes a hood lock mechanism 9 (hereinafter, referred to as a lock mechanism 9) and a hood lock release cable 10 (hereinafter, referred to as a lock release cable 10).

The lock mechanism 9 includes a latch 12 and an auxiliary hook 13.

In a center part of the lock mechanism 9, the latch 12 is disposed at a position toward which the striker 4 can move. The latch 12 is supported, with a shaft of the latch 12 (not illustrated) as the center, by a surface of the bracket 11 on the vehicle rear side (closer to the rear face of the vehicle).

The latch 12 can further be rotated in the counterclockwise direction in front view about the shaft by the biasing force of, for example, a spring (not illustrated).

With such a configuration, when the latch 12 engages the striker 4, the latch 12 is biased toward the striker 4 by the biasing force of the spring. Due to the configuration, the latch 12 can engage the striker 4.

That is, when the opening 7 is closed by the engine hood 3, the latch 12, by engaging the striker 4, can maintain such a closed state of the opening 7.

The auxiliary hook 13 is provided above the latch 12. A distal end of the auxiliary hook 13 is shaped so as to perform engagement with the striker 4. The auxiliary hook 13 is supported, with a shaft 16 as the center, by a surface of the bracket 11 on the vehicle front side. The auxiliary hook 13 can be rotated in the counterclockwise direction in front view about the shaft 16 by the biasing force of, for example, a spring (not illustrated). The auxiliary hook 13 and a lever 15 are formed as one body.

With such a structure, the auxiliary hook 13 functions to regulate the movement amount of the striker 4 in the upward direction even when the engagement state between the striker 4 and the latch 12 is released.

In one example, when the closed state of the opening 7 is released, the front end part of the engine hood 3 is slightly open. In this state, the striker 4 is kept at a position (above the latch 12) at which the striker 4 can perform engagement with the auxiliary hook 13. Thus, the movement amount of the striker 4 in the upward direction (in a direction where the front end part of the engine hood 3 is opened) can be regulated by the engagement between the striker 4 and the auxiliary hook 13.

When the closed state of the opening 7 is released, the lever 15 can be operated through a gap that is left by slightly opening the front end part of the engine hood 3. The front end part of the engine hood 3 is lifted while a release operation is performed with the lever 15, and the engine hood 3 can thereby open the opening 7.

The lock release cable 10, as partially cut away in FIG. 2, includes an outer tube 10*a* and an inner wire 10*b*.

The outer tube 10*a* is formed by using, for example, a resin material that can be curved. The outer tube 10*a* constitutes an outer circumferential face (outer sheath) of the lock release cable 10.

The inner wire 10*b* is formed by using, for example, a metal material. The inner wire 10*b* is slidably inserted inside the outer tube 10*a*.

One end of the inner wire 10*b* of the lock release cable 10 configured as described above is coupled to the latch 12 of the lock mechanism 9 (refer to FIG. 3).

The other end of the inner wire 10*b* is coupled to an operation lever 17 provided in the vehicle compartment (refer to FIG. 2). As described above, the latch 12 of the lock mechanism 9, to which the inner wire 10*b* is coupled, can be operated in the vehicle compartment by an operation on the operation lever 17. The inner wire 10*b* moves back and forth inside the outer tube 10*a* by the operation on the operation lever 17. Thus, the lock release cable 10 can release the engagement state between the latch 12 and the striker 4 by operating the latch 12.

The lock release cable 10 is routed along the frame 8.

In one example, as FIGS. 2, 3, and 4 illustrate, for example, a front portion of the lock release cable 10 is routed, inside the radiator-core upper frame 8*a*, in the vehicle width direction along the wall 23 closer to the engine room 5. Note that, for example, the lock release cable 10 can be retained on the wall 23 side by a retaining member 40 such as a clip.

In addition, as FIGS. 2, 5, and 6 illustrate, for example, a middle portion of the lock release cable 10 is routed, below the radiator-core side-upper frame 8*b*, in a direction from the engine room 5 side of the first coupling part 19 to the flange 27, of the second coupling part 21, formed closer to the outside of the vehicle.

In addition, as FIGS. 2, 5, 7 and 9 illustrate, for example, a rear portion of the lock release cable 10 is routed, in the vicinity of the second coupling part 21, at a position close to a part of the flange 31 formed in the front end part of the upper frame 8*c*. In one example, on the engine room 5 side relative to the flange 31, the lock release cable 10 is routed at a position close to the flange 31. Further, on the rear side relative to the second coupling part 21, the lock release cable 10 is routed through a lower end of the flange 31 and extends to a part of the upper frame 8*c* closer to the outside of the vehicle. The lock release cable 10 is routed along a surface of the flange 31 closer to the outside of the vehicle.

Note that the lock release cable 10 routed along a part of the flange 31 closer to the outside of the vehicle can be retained on the surface of the flange 31 closer to the outside of the vehicle by, for example, a retaining member 41 such as a clip.

Accordingly, a portion of the lock release cable 10 is routed closer to the engine room 5 than the headlamp unit 35 and the flange 31.

Figure 11:
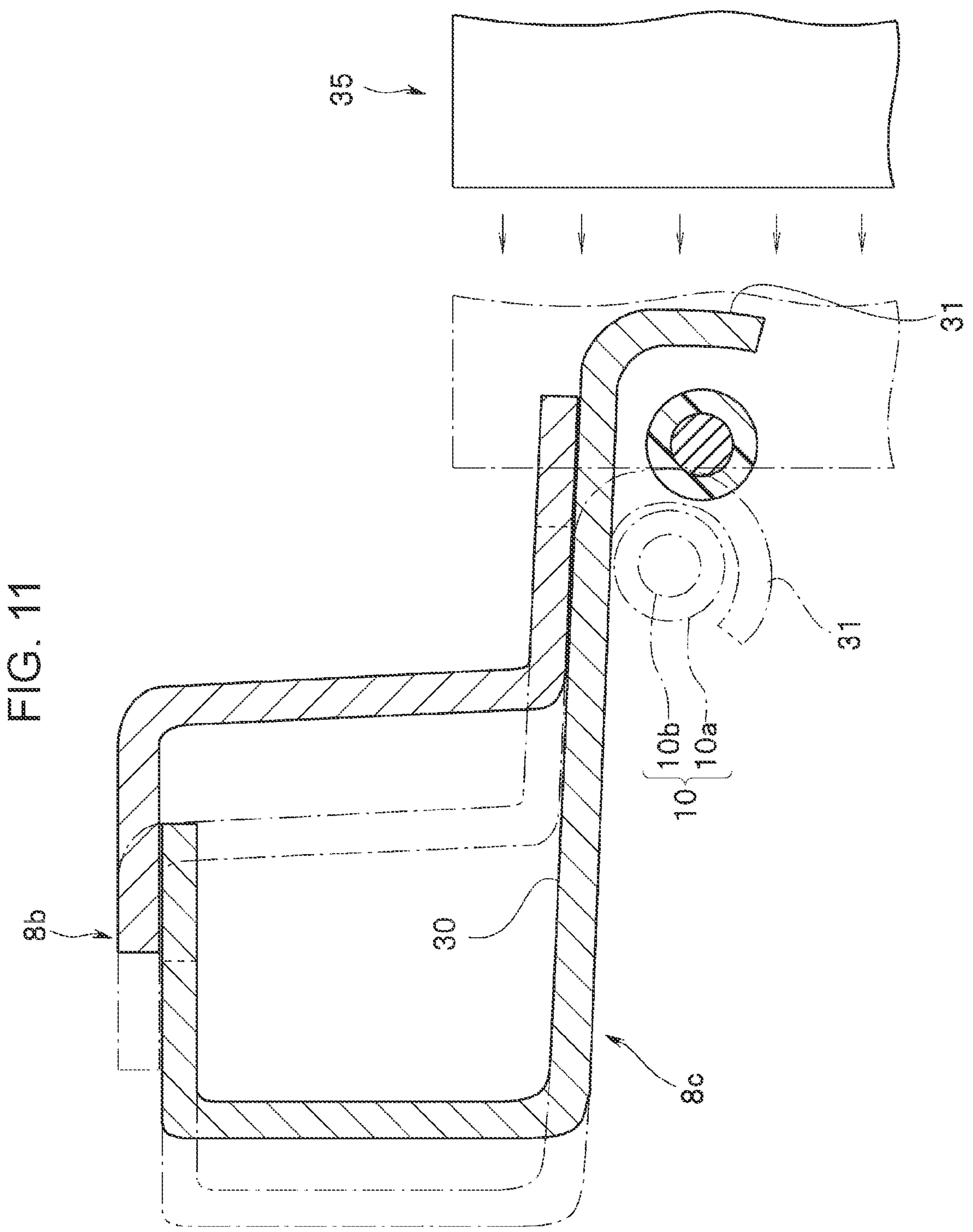
FIG. 11 is a cross-sectional view taken along line XI-XI in FIG. 5 and illustrates a deformation state of a flange when the headlamp unit is displaced toward the inside of the body due to a collision.

The lock release cable 10 routed as described above is held by the flange 31, for example, when the headlamp unit 35 is displaced toward the engine room 5 due to a shift collision. That is, as FIG. 11 illustrates, the front end part of the flange 31 is deformed toward the inside of the body 2 when the headlamp unit 35 is displaced toward the inside of the body 2 due to a shift collision or other events of the vehicle 1. Thus, a portion of the lock release cable 10 is held by the upper frame 8*c* due to the flange 31.

In this case, the flange 31 has an arc shape directed slightly toward the inside of the vehicle. Thus, the front end part of the flange 31 can be deformed toward the bottom part 30 when the flange 31 is pushed toward the inside of the body 2 by the headlamp unit 35.

The lock release cable 10 routed along a part of the flange 31 is routed at a position (on the inner side in a deformation direction of the flange 31) at which the lock release cable 10 is held due to the deformation of the flange 31. Thus, the lock release cable 10 can be held due to the deformation of the flange 31 along which the lock release cable 10 is routed.

By being held by the flange 31, the lock release cable 10 can be displaced with the frame 8 in an integrated manner.

Figure 12:
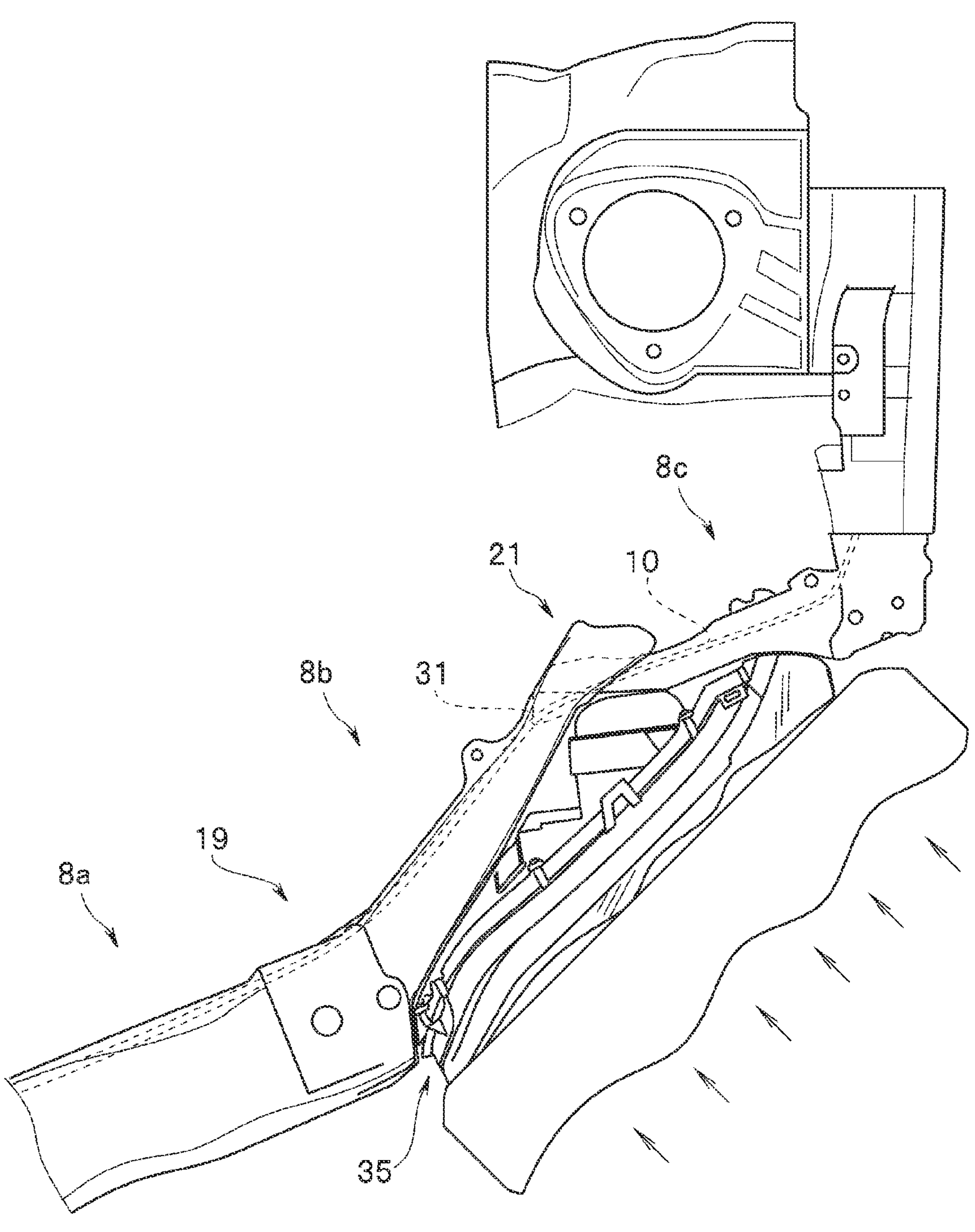
FIG. 12 is a plan view illustrating the displacement of each of the frame and the lock release cable during a shift collision.

That is, the lock release cable 10 can be displaced while following the frame 8. Thus, as FIG. 12 illustrates, the displacement amount of the lock release cable 10 can be regulated to be substantially the same as the displacement amount of the frame 8.

Thus, even when a shift collision or other events of the vehicle 1 occur, the lock release cable 10 can be prevented from being pushed toward the engine room 5 to a large extent by a peripheral component such as the headlamp unit 35.

That is, during a collision or other events, the inner wire 10*b* can be prevented from being pulled by a traction amount large enough to operate the latch 12. Thus, the routing structure of the lock release cable 10 can prevent an unintended lock release of the engine hood 3 caused by the lock mechanism, under a strong impact of a collision or other events of the vehicle 1 (for example, a shift collision).

In this case, for example, the routing structure of the lock release cable 10 of the embodiment employs a configuration where the deformation of the flange 31 causes the frame 8 to hold the lock release cable 10. Thus, the routing structure of the embodiment enables reduction in the number of fixing members for routing. Accordingly, the routing structure of the embodiment, even with low cost, can prevent an unintended lock release of the engine hood 3.

According to such an embodiment, the routing structure of the lock release cable 10, includes the frame 8, the lock release cable 10, and the headlamp unit 35. The frame 8 surrounds the engine room 5 of the body 2 of the vehicle. The lock release cable 10 is routed along the frame 8 and operates the lock mechanism 9 of the engine hood 3 by being operated with the operation lever 17 provided in the compartment of the vehicle. The headlamp unit 35 that is a peripheral component is mounted on the frame 8 at a position closer to the outside of the vehicle than the frame 8. The frame 8 includes the flange 31 at a position facing the headlamp unit 35 and at which a portion of the lock release cable 10 is routed. The flange 31 is shaped so as to be deformed and hold the lock release cable 10 when a collision of the headlamp unit 35 occurs. With such a configuration, the routing structure of the lock release cable 10 can prevent an unintended lock release of the engine hood 3 caused by the lock mechanism, even under a strong impact of a collision or other events of the vehicle.

The disclosure described in the embodiment above is not limited to such an embodiment, and, in addition, various modifications can be made without departing from the scope of the disclosure in an implementation stage. The above-described embodiment includes techniques in various stages, and the disclosure in various patterns can be derived by appropriately combining the disclosed elements.

In a case where the described problem can be solved, and an effect described herein can be exhibited even when some elements are removed from all of the elements given in the above-described embodiment, the configuration from which the elements are removed can be derived as the disclosure.

According to the routing structure of the lock release cable of the embodiment of the disclosure, an unintended lock release of the engine hood caused by the lock mechanism can be prevented even under a strong impact of a collision or other events of the vehicle.

The invention claimed is:

1. A routing structure for a hood lock release cable, the routing structure comprising:

a frame member surrounding an engine room of a body of a vehicle;

a hood lock release cable that is routed along the frame member, the hood lock release cable being configured to operate a hood lock mechanism of an engine hood of the vehicle by being operated with an operation lever provided in a compartment of the vehicle; and a peripheral component mounted on the frame member at a position closer to an outside of the vehicle than the frame member, wherein the frame member comprises a flange extending downward from a bottom part of the frame member at a position facing the peripheral component and at which a portion of the hood lock release cable is routed, the hood lock release cable being routed on an engine room side of the flange, and wherein the flange is shaped so as to be deformed toward the bottom part of the frame member and hold the hood lock release cable between the flange and the bottom part when a collision of the peripheral component occurs.

2. The routing structure for the hood lock release cable according to claim 1, wherein the hood lock release cable is routed on an inner side in a direction where the flange is deformed when a collision of the peripheral component occurs.

3. The routing structure for the hood lock release cable according to claim 1, wherein the peripheral component is a headlamp unit.

4. The routing structure for the hood lock release cable according to claim 2, wherein the peripheral component is a headlamp unit.

5. The routing structure for the hood lock release cable according to claim 1, wherein the hood lock release cable comprises an inner wire consisting of a metal wire and an outer tube of a resin covering an outer circumferential side of the inner wire.

6. The routing structure for the hood lock release cable according to claim 1, wherein a distal end of the flange has an arc shape directed toward an inside of the vehicle.

7. The routing structure for the hood lock release cable according to claim 1, wherein the frame member includes a top panel facing an inner surface of the engine hood, a wall extending downward from an end part of the top panel on an engine room side, the bottom part extending from a lower end part of the wall to an outer side in a vehicle width direction, and the flange extending downward from an end part of the bottom part on the outer side in the vehicle width direction.

8. The routing structure for the hood lock release cable according to claim 1, wherein the frame member is one of a plurality of frame members constituting a frame surrounding the engine room, the plurality of frame members including a radiator-core upper frame extending in a vehicle width direction in a front part of the body, a pair of radiator-core side-upper frames extending from both end parts of the radiator-core upper frame toward a rear of the vehicle, and a pair of upper frames extending from rear end parts of the radiator-core side-upper frames toward the rear of the vehicle, and wherein the flange is formed at a front end part of one of the upper frames.

9. The routing structure for the hood lock release cable according to claim 8, wherein a rear end part of the radiator-core side-upper frame and a front end part of the upper frame constitute a coupling part, and wherein at the coupling part, a top panel of the upper frame overlaps a top panel of the radiator-core side-upper frame from below, and the bottom part of the upper frame overlaps a flange of the radiator-core side-upper frame from below.

10. The routing structure for the hood lock release cable according to claim 8, wherein the peripheral component is a headlamp unit mounted on the radiator-core side-upper frame and the upper frame at a position closer to the outside of the vehicle than the radiator-core side-upper frame and the upper frame.

11. The routing structure for the hood lock release cable according to claim 3, wherein the headlamp unit includes a housing retaining a light source, and the housing faces a front end part of the flange.

12. The routing structure for the hood lock release cable according to claim 10, wherein the headlamp unit further includes a pair of brackets provided on an upper part of the housing, the pair of brackets being bolted to top panels of respective ones of the frame members on which the headlamp unit is mounted.

13. The routing structure for the hood lock release cable according to claim 8, wherein a front portion of the hood lock release cable is routed inside the radiator-core upper frame in the vehicle width direction, wherein a middle portion of the hood lock release cable is routed below the radiator-core side-upper frame, and wherein a rear portion of the hood lock release cable is routed at a position close to the flange formed in the front end part of the upper frame.

14. The routing structure for the hood lock release cable according to claim 1, wherein on a rear side relative to the flange, the hood lock release cable is routed through a lower end of the flange and extends to a part of the frame member closer to the outside of the vehicle.

15. The routing structure for the hood lock release cable according to claim 14, wherein the hood lock release cable routed along a part of the flange closer to the outside of the vehicle is retained on a surface of the flange closer to the outside of the vehicle by a retaining member.

16. The routing structure for the hood lock release cable according to claim 15, wherein the retaining member is a clip.

17. The routing structure for the hood lock release cable according to claim 1, wherein when the flange is deformed and holds the hood lock release cable, a displacement amount of the hood lock release cable is regulated to be substantially the same as a displacement amount of the frame member.

18. The routing structure for the hood lock release cable according to claim 1, wherein the hood lock mechanism includes a latch configured to engage a striker provided on the engine hood, and an auxiliary hook configured to regulate a movement amount of the striker when an engagement state between the striker and the latch is released.

19. A routing structure for a hood lock release cable, the routing structure comprising:

a frame surrounding an engine room of a body of a vehicle, the frame including a radiator-core upper frame extending in a vehicle width direction in a front part of the body, a radiator-core side-upper frame extending from an end part of the radiator-core upper frame toward a rear of the vehicle, and an upper frame extending from a rear end part of the radiator-core side-upper frame toward the rear of the vehicle, the upper frame including a top panel, a wall extending downward from an end part of the top panel on an engine room side, a bottom part extending from a lower end part of the wall to an outer side in the vehicle width direction, and a flange extending downward from an end part of the bottom part on the outer side in the vehicle width direction, a distal end of the flange having an arc shape directed toward an inside of the vehicle;

a hood lock release cable that is routed along the frame, the hood lock release cable being configured to operate a hood lock mechanism of an engine hood of the vehicle by being operated with an operation lever provided in a compartment of the vehicle, wherein a portion of the hood lock release cable is routed on an engine room side of the flange at a position close to the flange; and a headlamp unit mounted on the radiator-core side-upper frame and the upper frame at a position closer to the outside of the vehicle than the radiator-core side-upper frame and the upper frame, the headlamp unit including a housing that faces a front end part of the flange, wherein the flange is shaped so as to be deformed toward the bottom part when the headlamp unit is displaced toward the inside of the body due to a collision, thereby holding the hood lock release cable between the flange and the bottom part.

20. The routing structure for the hood lock release cable according to claim 19, wherein, when the flange is deformed and holds the hood lock release cable between the flange and the bottom part, a displacement amount of the hood lock release cable is regulated to be substantially the same as a displacement amount of the frame, such that the hood lock release cable is prevented from being pulled by a traction amount sufficient to operate the hood lock mechanism.

* * * * *